Patented Jan. 9, 1934

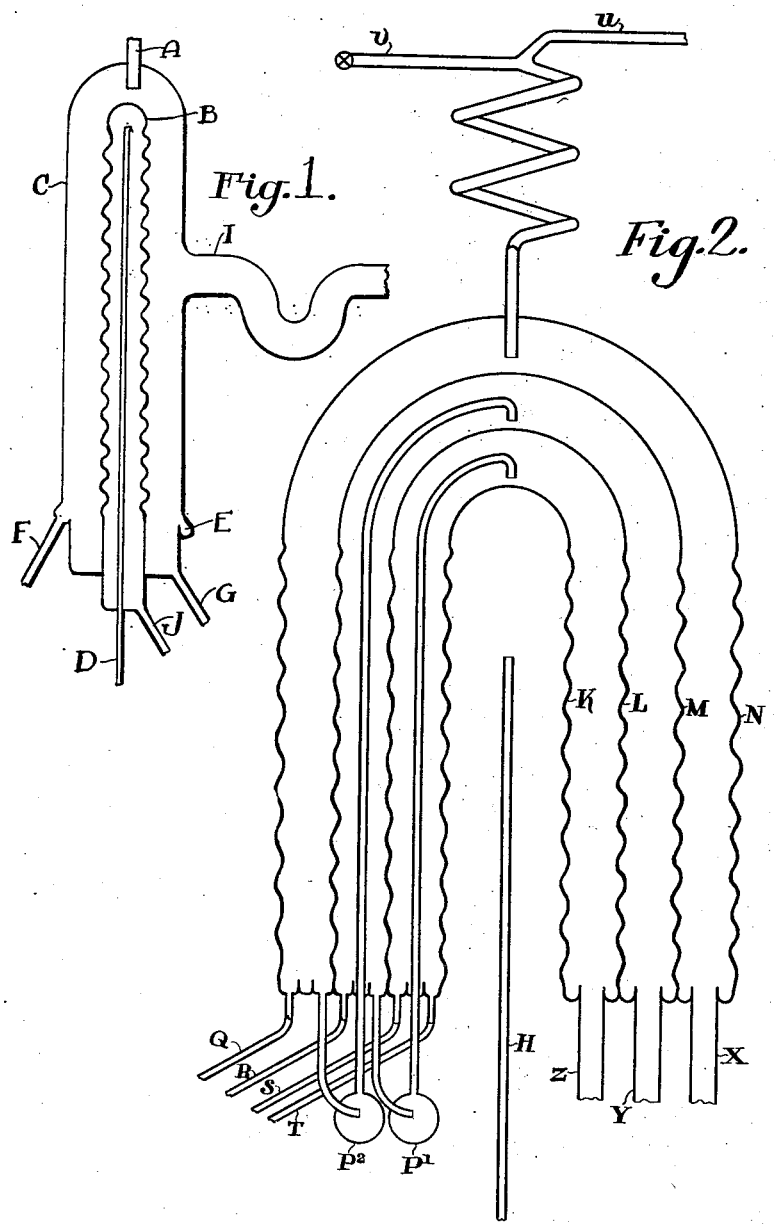

1,942,858

UNITED STATES PATENT OFFICE 1,942,858

DISTILLATION APPARATUS

Kenneth C. D. Hickman, Rochester, N. Y., assignor to Eastman Kodak Company, Rochester, N. Y., a corporation of New York Application December 23, 1930
Serial No. 504,306

4 Claims. (Cl. 196—77)

This invention relates to a novel apparatus for vacuum distillation of difficultly volatile liquids. The invention involves the use of vacua higher and more complete than have hitherto been employed in the chemical industry, and although it contemplates the employment of a high vacuum condition for the distillation of any amenable liquid substance or solution, it is particularly concerned with the preparation of products met with in the oil industry.

These products may be essentially mineral; or they may be vegetable or animal. In the first instance my invention may be applied to the fractionation of topped crude oils to produce at abnormally low temperatures lubricating oil, waxes and unburnt pitches; in the second it may be used to purify by sublimation, certain oils, essences or scents which are ordinarily harmed by volatilization; and in the third to separate either useful or objectionable constituents from such animal oils as cod liver oil.

Two well defined forms of distillation are recognized at the present time: Distillation with ebullition and evaporative distillation. When a liquid is heated at atmospheric pressure the temperature rises until the vapor pressure of the liquid rises above that of the atmosphere and boiling commences from the formation of bubbles of vapor below the surface. If the external pressure is reduced, there comes a condition at a pressure of about 5 mm. of mercury or less when boiling ceases and all the vapor is evolved from the surface. This is evaporative distillation. Evaporative distillation takes place more slowly than ordinary distillation unless certain conditions are fulfilled which have long been recognized by scientific workers. The conditions involve a vacuum or rather vapor phase and they comprise (a) keeping the evaporative and condensing surfaces near one another; (b) providing a pressure of residual uncondensable gas, generally air, so low that no substantial interruption is caused to the stream of the molecules passing between the surface.

Those conditions which are realizable in the laboratory are difficult to secure in commercial practice, and there is one further difficulty concerning the liquid phase. The preferential volatilization of the lighter constituents of a mixed liquid in a reasonable time is only possible if the liquid is stirred. Diffusion in a perfectly still liquid is so slow that months would be required for volatile molecules first situated at the bottom of any considerable amount of liquid to come to the surface. Stirring is ordinarily effected by boiling, but in evaporative condensation it may be entirely absent. Mechanical stirring can only be resorted to at the cost of a vacuum tight bearing. Further, in a mechanically stirred mass a large proportion of liquid must be maintained hot and inoperative while a small proportion is transferred each moment to the surface and made operative. This encourages thermal decomposition which spoils the product and generates gases in quantities proportional to the total bulk of liquid, impairing the vacuum and necessitating a higher and more harmful operating temperature. The effects work on one another in a vicious circle so that with many substances for which higher vacua are most desirable, it has been impossible to operate under higher vacuum.

The present invention disposes of the inherent difficulties of holding an evaporation surface next to the condensing surface, and it further secures the rapid treatment of a relatively small bulk of material while spread over a relatively large area down which it flows by gravity. The area is in the form of a tube having regular spiral corrugations embossed around its circumference to spread the liquid and cause intimate stirring. A natural flow in the thinnest possible layer is greatly superior to heating in shallow trays if only the natural flow can be spread evenly over the surface. The spiral corrugations prevent the tendency of liquids evaporating on hot surfaces to gather into local streams. Such stream become diverted by the spirals and begin to fall down their trails continually overflowing at new places until the whole surface is evenly covered. Haphazard projections or regular projections or regular projections in other than spiral formation have been found not to be as effective for this purpose as the spiral form and consequently this spiral is the preferred form of contour although any type of irregularity may be used.

An illustrative embodiment of the carrying out of my invention is shown in Figure 1. It consists of a heated column closely adjacent to an enclosed cool surface. The head of the vertical heated column is under a source of liquid supply. In the apparatus illustrated a pipe A supplies the oil or other liquid to be treated. It is preferred that the liquid be degassed which may be done by attaching an evacuation pump to the pipe A. The oil is allowed to drop from the tube A to the glass dome B as shown. A gas tight valve may be used to regulate this flow. The column or dome B has a spiral wound about the outside to spread the oil evenly over the surface in a thin layer. Inside the dome or column B is a tube D which supplies steam or hot vapor to the inside of the column to warm the dome to the desired temperature. Electrical heating means or other heating means that can be regulated may be substituted for that shown. With the heating means shown the vapor condenses within the dome B and is then returned to the boiler through pipe J. The dome is surrounded by a cylindrical chamber C, the walls of which are an inch or less from the column. If desired the walls of this chamber may be artificially cooled, e. g., by cooling coils. The chamber C is completely enclosed so that it may be evacuated. To it is attached a pipe I containing a trap leading to a condensation and evacuation pump. The trap is preferably cooled artificially to condense any vapors passing through. The condensate is collected by means of a pipe F, which is attached to a trough E in which the condensate collects and it then passes through F. F ends in a closed receptacle which is necessary in order to keep the inside of the chamber evacuated. Likewise the said oil collects at the bottom of the chamber and after running down along the side of column B is passed off through pipe G which also is connected with a closed receptacle. However, instead of the passages F and G ending in a closed receptacle, any suitable type of valve may be used in the pipe. Laboratory size apparatus is conveniently made from glass, but larger constructions can employ metal parts.

Distillation is made rapid when there is no molecular obstruction between C and B and I prefer to make these surfaces as near together as possible, preferably within the molecular free path of the gases present in the distillation chamber. Thus when it is convenient for the gases to have a pressure of less than .001 mm. mercury, it is well to have the surfaces within one or two inches of each other, with a gas pressure of .0001 mm. of mercury, surfaces may be 10 times this distance and so prorata.

My invention also lends itself admirably to the multi-stage fractionation of oils, especially of a mineral nature. In Figure 2 is shown the preferred embodiment of this invention applied to multi-stage distillation. This apparatus is a modification of that shown in Figure 1 in that the apparatus is arranged so that the distillation is carried out in a series of steps, thus making possible the separation of the various fractions if desired. The type of apparatus shown in Figure 2 is especially applicable to mineral oils such as petroleum. The apparatus comprises a series of columns, K, L, M, and N, each column having a hood for the one previous which is smaller and situated inside. Outlets for evacuating are also present for each individual chamber, namely X, Y, and Z. The amount of evacuation is graduated, the chambers N—M being the least rarified, while the chamber K—L is the most highly rarified. This is accomplished by the presence of a high vacuum pump on outlet Z and, of course, Y has a medium vacuum pump and X has a pump of lower evacuating power.

The outlets Q, R, S, and T are to carry off the products of the carrying out of this process. If, for example, mineral oil was the material being distilled, the lighter hydrocarbons would pass out through tube Q. Oil of about the consistency of engine oil would pass off through R, while the heavier oil would be discharged through tube S. The pitch or residue is then drained off by means of tube T. As in Figure 1, also in Figure 2, there may be present a degassing pipe U which is connected to the feed pipe V. Also it is necessary that oil be supplied to columns L and K. This is done by pumps $P_2$ and $P_1$ respectively, reticulated to the previous chamber and pumped to the top of the column.

The apparatus is supplied with a suitable heating element H such as used in Figure 1. The respective columns are heated by the condensation upon their inner surfaces of the vapors from the surface of the column directly beneath, and the supply of heat may be supplemented or diminished by heating elements contained in the walls of the domes or in the corrugations. By this means also there is also a gradation of temperature downwardly from the inside out.

My process of distillation comprises the novel step of distilling in a vacuum so that the condensing surface is at a distance approximately equal to the mean free path of the molecule of gas in the distillation chamber or, in other words, the distance permissible is inversely proportional to the amount of evacuation of the distillation chamber. It is to be understood that a distance less than the mean free path of the molecule of this gas is suitable and may even be preferred in some cases. However, the distance between the film and the condensing surface can only be slightly above this determining value or else the process becomes inoperable. It is to be understood that my process is limited only to the feature of the condensing surface which determines the distance from the surface of the liquid being distilled.

Various modifications of this novel feature will at once become apparent, for example, the process may be carried out in an evacuated chamber containing liquid in which the roof is the requisite distance from the surface of the liquid, and of course the vapors wil condense upon the roof.

One very important application of the invention is the production of de-waxed mineral oils. It is well known that lubricating oils from paraffine base petroleums which have been de-waxed resist viscosity change under varying temperature conditions much better than the ordinary lubricating oil which contains the paraffine. By my process an oil is produced which maintains a substantialy uniform viscosity under temperature variations and which has a comparatively high lubrication value in the cold.

What I claim as my invention and desire to secure by Letters Patent of the United States is:

1. A distillation apparatus which comprises a series of nested irregular domes forming chambers adapted to be evacuated, a source of heat within the smallest dome, a regulatable inlet for dropping liquid on each dome that is enclosed, means for supplying the liquid from the outer surface of each dome to the top of the dome directly beneath, outlets for leading off any liquid attached to the inner wall of each dome except the smallest, and an outlet for leading off any liquid attached to the outer surface of the smallest dome.

2. A distillation apparatus which comprises a hollow dome having a smooth, spirally corrugated, substantially vertically disposed surface devoid of pockets in which liquid can accumulate, and over which the liquid being distilled can freely cascade, a source of heat within the dome, an enclosing chamber adapted to be evacuated surrounding said dome, a regulated inlet for dropping liquid on to the dome and outlets for withdrawing the products of the distillation.

3. A distillation apparatus which comprises a hollow dome having a smooth, spirally corrugated, substantially vertically disposed surface adapted to produce a continuous flow of liquid in a stream of extremely shallow depth and devoid of pockets in which liquid can accumulate, a source of heat within the dome, an enclosing chamber adapted to be evacuated surrounding said dome, a regulated inlet for dropping liquid onto the dome, outlets for withdrawing the products of the distillation, the distance of the inner surface of the chamber from the outer surface of the dome being a distance not substantially more than the mean free path of the molecule of the rarefied air which a given degree of vacuum will make possible.

4. A distillation apparatus which comprises a hollow dome having a smooth, spirally corrugated, substantially vertically disposed surface adapted to produce a continuous flow of liquid in a stream of extremely shallow depth and devoid of pockets in which liquid can accumulate, a source of heat within said dome, an enclosing chamber surrounding said dome containing an incondensible gas at low pressure, means for producing and maintaining the incondensible gas at low pressure, a regulatable inlet for dropping liquid on to the dome and outlets for withdrawing the products of the distillation, the distance of the inner surface of the chamber from the outer surface of the dome being directly proportional to the degree of evacuation produced by the evacuating means.

KENNETH C. D. HICKMAN.